United States Patent [19]
DeLara

[11] Patent Number: 5,599,191
[45] Date of Patent: Feb. 4, 1997

[54] PATCH PANEL PROVIDING 50-PIN CONNECTORS

[75] Inventor: Gilberto DeLara, Clarkston, Ga.

[73] Assignee: BellSouth Corporation, Atlanta, Ga.

[21] Appl. No.: 396,177

[22] Filed: Feb. 24, 1995

[51] Int. Cl.⁶ .................................. H01R 29/00
[52] U.S. Cl. ............................................. 439/49
[58] Field of Search ...................... 439/43, 49–54, 439/638, 639, 540.1

[56] References Cited

U.S. PATENT DOCUMENTS

| | | | |
|---|---|---|---|
| 3,950,058 | 4/1976 | Cronin | 439/49 |
| 3,990,763 | 11/1976 | Kress | 439/638 |
| 4,764,849 | 8/1988 | Khan | 439/49 |

OTHER PUBLICATIONS

Ortronics data book, pp. 14 and 21.
Black Box Corporation Catalog, p. 194.
The Siemon Company data book, p. 40.
Anixter Bros., Inc. catalog, 1991, pp. 1–5, 1–6, 1–30, 1–47.

*Primary Examiner*—Gary F. Paumen
*Attorney, Agent, or Firm*—Robin, Blecker, Daley & Driscoll

[57] ABSTRACT

A patch panel facilitates cabling connections with a telecommunications switching device which has input/output ports arranged in vertical columns. A row of fifty-pin standard terminals is on a front side of the connection panel, with each terminal of the row corresponding to a respective column of the switching device. On a reverse side of the connection panel are provided two horizontal rows of fifty-pin terminals, one row for incoming signals and the other row for outgoing signals, to minimize cross-talk. The total number of terminals on the front side of the connection panel is the same as the number of terminals on the reverse side of the connection panel.

20 Claims, 5 Drawing Sheets

5,599,191

PATCH PANEL PROVIDING 50-PIN CONNECTORS

FIELD OF THE INVENTION

This invention relates to an electrical connecting device, and, more particularly, to a connecting device useful in connecting telecommunications signal lines with a switching device.

BACKGROUND OF THE INVENTION

Most telecommunication switching devices that have heretofore been available have included terminals for directly connecting incoming and outgoing telecommunications signal cabling directly to the switching device. However, there have recently been introduced switching devices having a modular design in which a variable number of card units are included, with the card units oriented in a vertical direction. An example of such switching devices is the B-STDX 9000 broadband packet switch manufactured by Cascade Communications Corp., Westford, Mass. In this switching device, connections to the card units are to be made via ports arranged in vertical columns, with each column of ports corresponding to a respective card unit. The ports provided in such a switching device are not conveniently arranged for connection with incoming and outgoing signal cables. Although a patch connection panel of conventional design could be interposed between the ports of the switch device and the incoming and outgoing cables, conventional patch panels would provide an inconvenient, cluttered, and very confusing cabling arrangement between the patch panel and the switching device ports.

OBJECTS AND SUMMARY OF THE INVENTION

It is accordingly an object of the invention to provide a patch panel for facilitating connection between a telecommunication switching device and incoming and outgoing signal cables.

It is a further object of the invention to provide a patch connection panel which permits orderly interconnection between switching device ports arranged in vertical columns and a plurality of incoming and outgoing telecommunication signal channels.

It is still a further object of the invention to provide a connection panel arranged to suppress cross-talk between incoming and outgoing signal paths.

According to an aspect of the invention, there is provided a connection panel including a frame member, a plurality of first terminals provided on the frame member, with the first terminals all being identical and each being a standard type of terminal, a plurality of second terminals provided on the frame member, with the second terminals all having the same position layout as the first terminals, and wiring disposed within the frame member for interconnecting the first terminals and the second terminals. According to further aspects of the invention, each of the first and second terminals is a fifty-position standard telephone company female terminal arranged with two adjacent vertical columns having twenty-five positions in each column. Also, the second terminals are arranged in a horizontal row and the first terminals are arranged in two horizontal rows, with the first terminals consisting of fourteen terminals and the second terminals also consisting of fourteen terminals. Preferably the two rows of first terminals are separated from each other by a vertical distance that is at least as large as the height of the terminals. The first terminals are preferably arranged on an opposite side of the frame member from the second terminals and the frame member is arranged for rack mounting with a height of about 10.5 inches and a width of about 23 inches.

The foregoing and other objects, features and advantages of the invention will be further understood from the following detailed description of a preferred embodiment and from the drawings, wherein like reference numerals identify like components and parts throughout.

DESCRIPTION OF PREFERRED EMBODIMENTS

Figure 1:
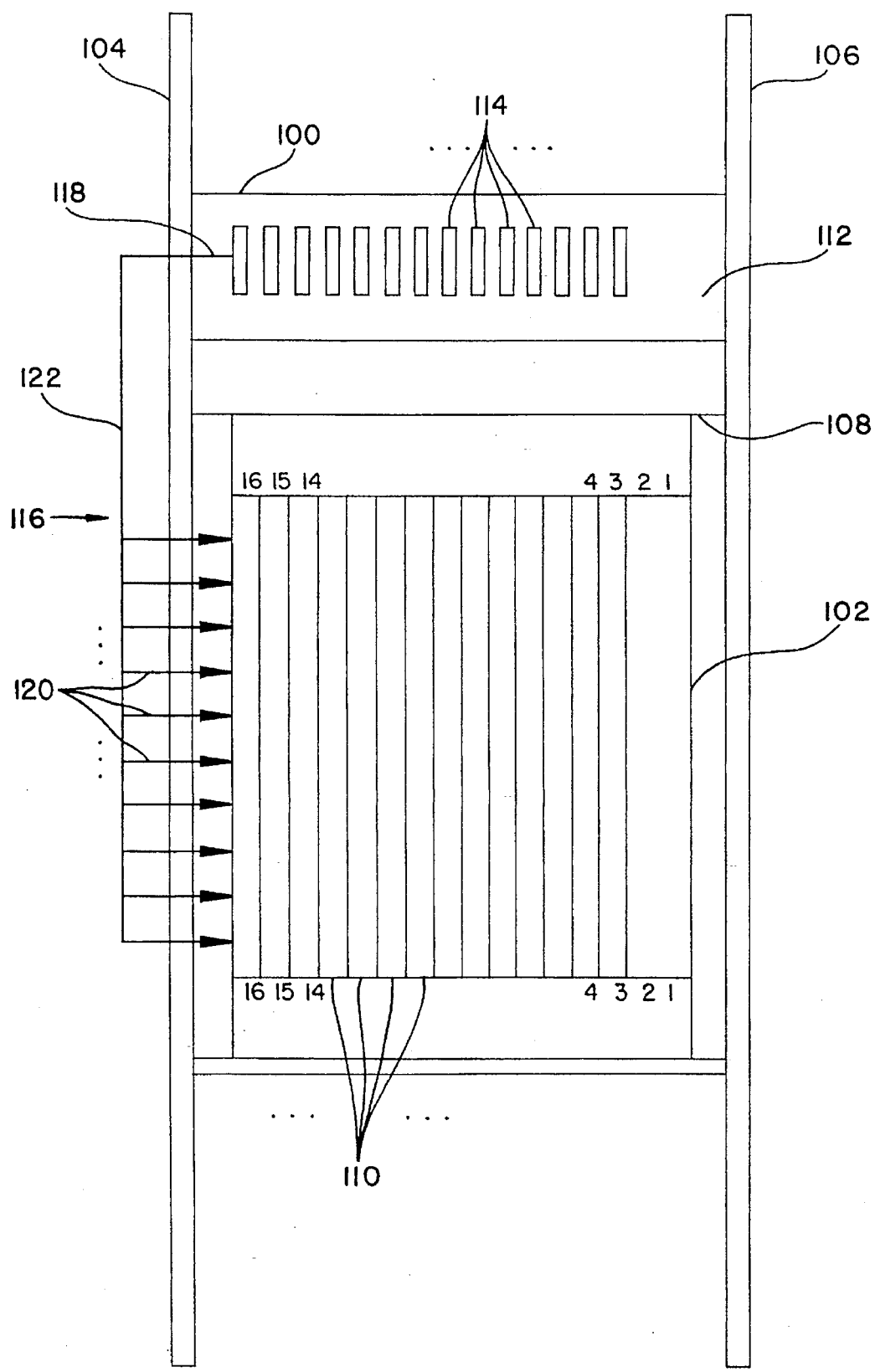
FIG. 1 shows a connection panel provided in accordance with the invention and rack-mounted together with a switching device.

FIG. 1 shows a connection panel 100, provided in accordance with the invention, and rack-mounted with a switching device 102. The switching device 102 may be the above-mentioned Cascade Model B-STDX 9000.

The rack-mounting hardware arrangement for the switching device 102 and the connection panel 100 is somewhat schematically represented by a left-side support member 104 and a right-side support member 106, between which the switching device 102 and the panel 100 are mounted. A cable organizer 108 is mounted on the support members 104 and 106, interposed between the connection panel 100 and the switching device 102. Although not shown in FIG. 1, a typical installation with the switching device 102 may also include a conventional modem rack and conventional data service units.

As shown in FIG. 1, the switching device 102 includes fourteen vertical columns 110 of input/output ports with up to ten ports in each vertical column. As partially indicated in FIG. 1, the columns 110 are numbered from left and right as 16, 15, 14, . . . , 4, 3. In order to simplify the drawing, the individual ports making up each vertical column 110 are not separately shown.

The connection panel 100 has a front side 112 on which are provided fourteen connection terminals 114. It will be noted that the number of connection terminals 114 of the connection panel 100 is equal in number to the columns 110 of I/O ports of the switching device 102. In addition, the connection terminals 114 are provided in a horizontal row, with uniform intervals between the terminals 114 and with a spacing that corresponds to the spacing of the columns 110 of the switching device 102. Also, according to the rack-mounting arrangement shown in FIG. 1, each of the terminals 114 of the connection panel 100 is positioned directly above a corresponding column 110 of the switching device 102.

Reference numeral 116 generally indicates a schematic representation of a cable provided to connect a terminal 114 of the connection panel 100 with the ten ports in a corresponding column 110 of the switching device 102. The cable 116 is of a type commonly referred to as an "octopus" or "Hydra" cable. The cable 116 has a main plug 118 at one end, adapted to be received by the terminal 114 of the connection panel 100, and ten secondary plugs 120 branching from the other end of the cable 116 and each adapted to be received by a respective port in the column 110 of I/O ports of the switching device 102.

Figure 5:
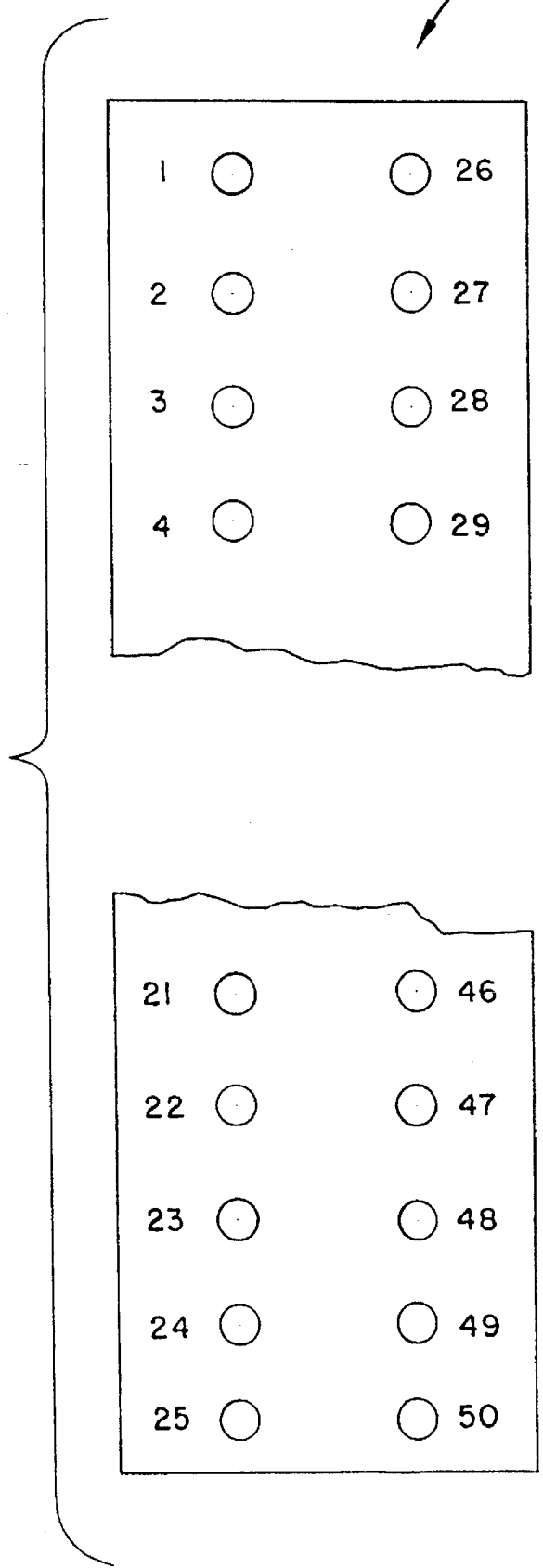
FIG. 5 is a partial elevational view showing the position layout of one of the connection terminals provided on the front and rear sides of the connection panel of FIG. 2.

In a preferred embodiment of the invention, each of the terminals 114 is of the standard type commonly used in telephone company applications in which fifty female connection positions are provided in two columns of twenty-five positions each (see FIG. 5). Accordingly, the main plug 118 of the cable 116 is a fifty-pin plug adapted to connect to the aforesaid standard fifty-position terminal. Also, the ten ports provided in each column 110 of the switching device 102 may be standard RJ-48C modular connectors, with which the secondary plugs 120 of the cable 116 are compatible.

Although not illustrated in the schematic rendering of FIG. 1, an intermediate portion 122 of the cable 116 is advantageously fastened to the cable organizer 108 in order to avoid cable movement.

Figure 2:
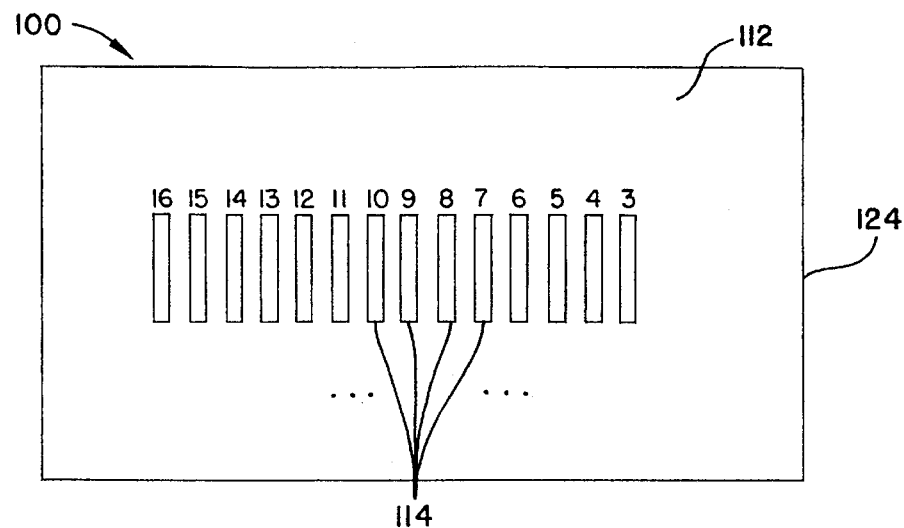
FIG. 2 is a front elevational view of the connection panel provided in accordance with the invention.

Additional details of the connection panel 100 will now be described, initially with reference to FIGS. 2–4.

Figure 3:
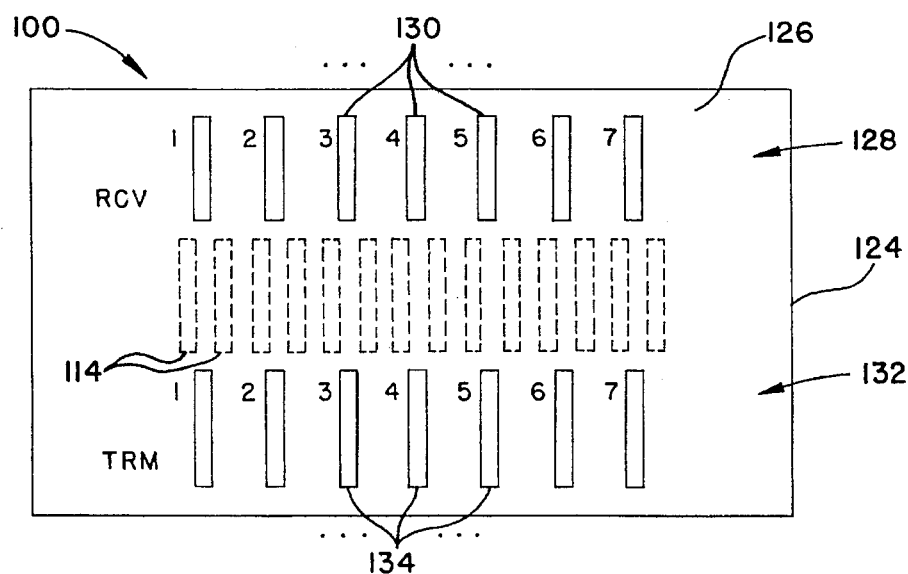
FIG. 3 is a rear elevational view of the connection panel of FIG. 2.

The connection panel 100 includes a main housing or frame member 124 which has the above-mentioned front side 112 and also has a rear side 126 (FIG. 3). Referring to FIG. 2, it will be noted that the above-mentioned fourteen terminals 114 are numbered 16, 15, 14, . . . , 4, 3 in correspondence to the previously-described numbering of the columns of ports of the switching device (FIG. 1).

Referring now to FIG. 3, which is a rear elevational view of the connection panel 100, it will be noted that there are provided on the rear side 126 of the panel 100 a horizontal row 128 of receive terminals 130. Also provided on the rear side 126 is another horizontal row 132 of transmit terminals 134. This segregation of the receive terminals from the transmit terminals is provided to prevent or reduce cross-talk between the incoming and outgoing signal lines.

All of the terminals 130 and 134 are of the same standard type as the previously described terminals 114, that standard type having the position layout schematically illustrated in FIG. 5. In particular, "position layout" should be understood to include the predetermined positional relationship among the 50 female connectors included in each terminal 114. (It should be appreciated that a male connector terminal having 50 pins in the same position layout shown in FIG. 5 could alternatively be provided.)

Continuing to refer to FIG. 3, it will be noted that the front side terminals 114 (used to interface with the switching device) are shown in phantom in FIG. 3 to indicate the relative positions among the front and rear side terminals. It will be observed that the row 132 of transmit terminals 134 is displaced downwardly from the row 128 of receive terminals 130 by a distance which exceeds the height of the standard terminals 114, 130, 134. The vertical spacing between the rows of transmit and receive terminals 130 and 134 facilitates the wiring (which will be discussed below) between the terminals 130 and 134 and the terminals 114.

It will further be observed that the receive terminals and the transmit terminals in their respective rows are numbered from 1 to 7.

Figure 4:
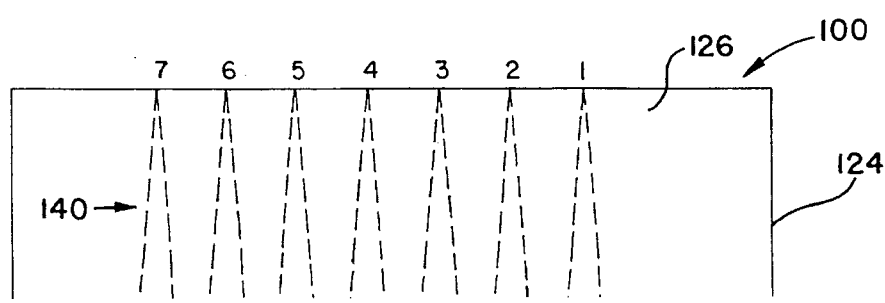
FIG. 4 is a top view of the connection panel of FIG. 2.
Figure 6:
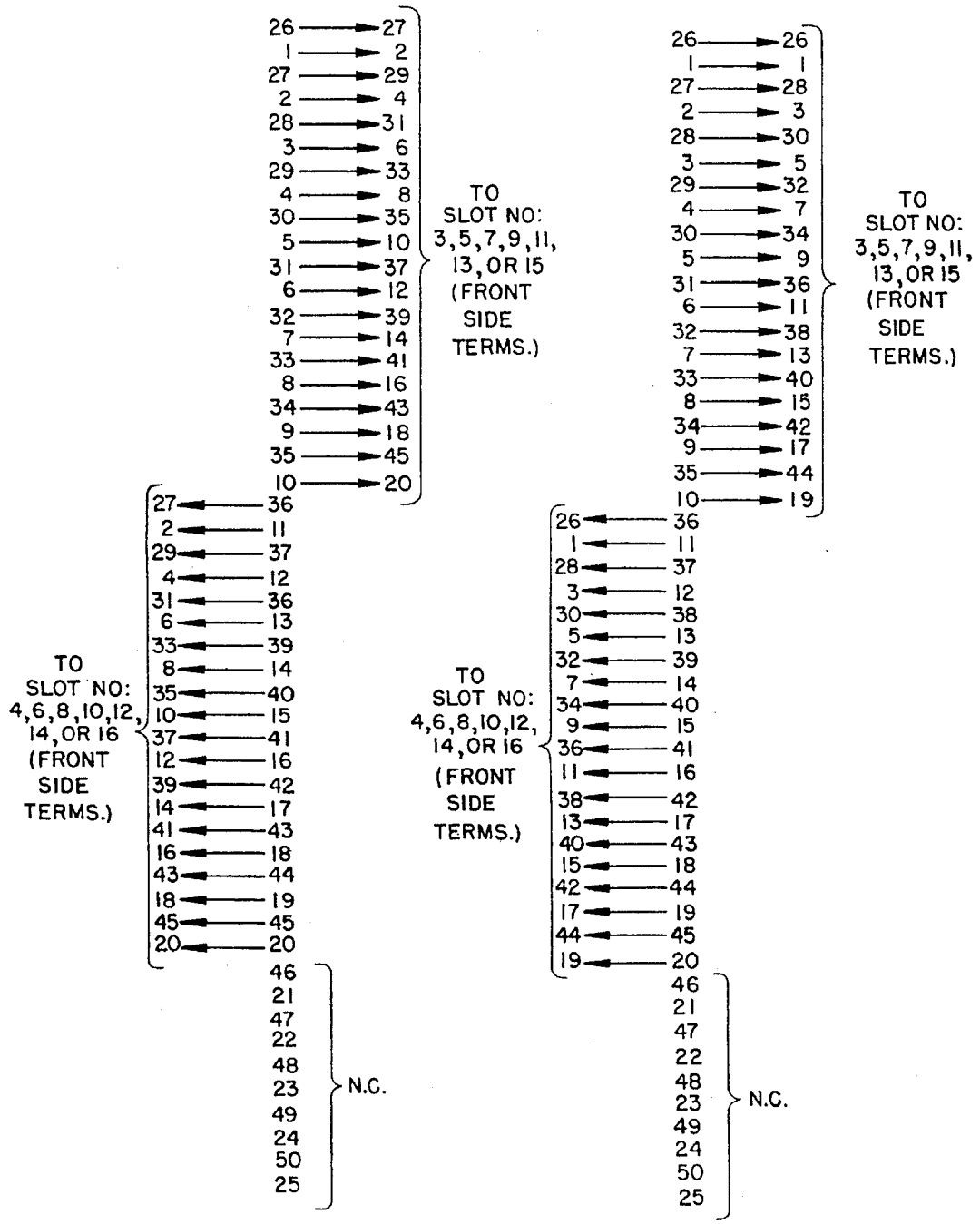
FIGS. 6 and 7 schematically illustrate typical electrical connections provided, within the connection panel of FIG. 2, between the connection terminals on the front and rear sides of the connection panel.
Figure 7:
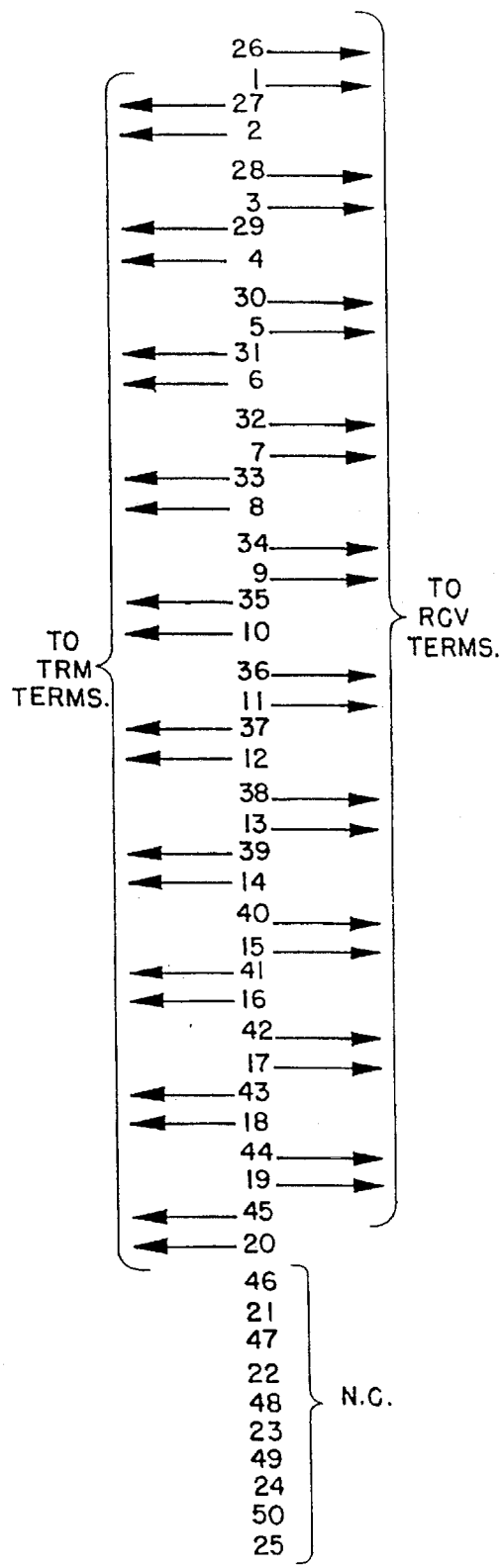

FIG. 4, which is a top view of the panel 124, schematically illustrates the electrical interconnection between the transmit and receive terminals 1–7, and the front-side (switch interface) terminals 3–16. In particular, leads 140 are provided within frame member 124 from the transmit and receive terminals 1 to the front side terminals 3 and 4; from transmit and receive terminals 2 to the front side terminals 5 and 6; and so forth. Typical pin-by-pin wiring from the transmit and receive terminals to the front side terminals is schematically illustrated in FIG. 6, and the pin-out arrangement from the front-side terminals is schematically illustrated in FIG. 7.

Figure 8:
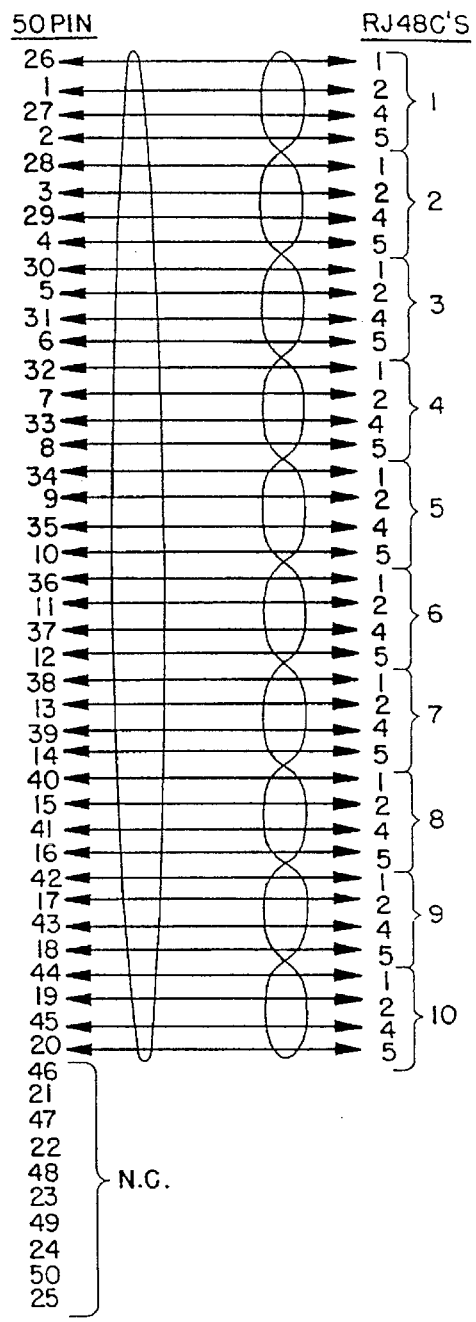
FIG. 8 schematically illustrates a cable connection provided between the ports on the switching device and the connection terminals on the front side of the connection panel.

FIG. 8 schematically illustrates the pin-to-pin connection provided by the Hydra cables 116 between the front-side terminals 114 of the connection panel 100 and the ten ports in a column 110 of the switching device 102. Although the schematic representation of FIG. 1 only shows a single Hydra cable 116, it will be understood as many as fourteen Hydra cables may be provided to respectively interconnect corresponding columns 110 and terminals 114.

Provision of the connection panel 100 disclosed herein allows for convenient and orderly cable installation for switching devices or other types of equipment employing vertically arranged port arrays. The cabling arrangement made possible by the connection panel 100 is particularly helpful during maintenance operations, including for example occasions when component cards of the switching device 102 are to be replaced. In addition, the separation of incoming and outgoing signal lines on the reverse side 126 of the connection panel 100 minimizes susceptibility to cross-talk.

Various changes in the above-described connection panel may be introduced without departing from the invention. For example, some or all of the female 50-position terminals on the connection panel 100 could be replaced with male terminals having the same layout. It is also contemplated to provide terminals 114, 130, 134 each having more or fewer connectors than 50 per terminal arranged with a layout other than the "telco 50-pin" arrangement shown in FIG. 5, so long as all of the terminals 114, 130, 134 have the same layout. Also, the respective vertical positions of the three rows of terminals could be changed. For instance, the separation between the rows 128 and 132 could be increased or decreased. The particularly preferred embodiment is thus intended in an illustrative and not limiting sense. The true spirit and scope of the invention is set forth in the following claims.

What is claimed is:

1. A connection panel, comprising:

a frame member;

a plurality of first terminals provided on said frame member and arranged in two horizontal rows on said frame member, said first terminals all being identical, each being a standard type of terminal;

a plurality of second terminals provided on said frame member and arranged in a horizontal row on said frame member, said second terminals all having a position layout that is the same as a position layout of said standard type of terminal; and means disposed within said frame member providing electrical connections between said first terminals and said second terminals.

2. A connection panel according to claim 1, wherein each of said first and second terminals is a fifty-position female terminal with 25 positions in each of two adjacent vertical columns.

3. A connection panel according to claim 1, wherein one of said two rows of first terminals is displaced downwardly from the other one of said two rows.

4. A connection panel according to claim 3, wherein said two rows of first terminals are separated from each other by a vertical distance that is at least as large as a height of the first terminals.

5. A connection panel according to claim 1, wherein said plurality of first terminals is equal in number to said plurality of second terminals.

6. A connection panel according to claim 5, wherein said plurality of first terminals consists of 14 terminals arranged in two horizontal rows of seven terminals each, and said plurality of second terminals consists of 14 terminals arranged in one horizontal row.

7. A connection panel according to claim 1, wherein all of said first terminals are provided on a first side of said frame member and all of said second terminals are provided on a second side of said frame member.

8. A connection panel according to claim 7, wherein said first side of said frame member is an opposite side from said second side of said frame member.

9. A connection panel according to claim 1, wherein said frame member is arranged for rack-mounting and has a height of substantially 10.5 inches and a width of substantially 23 inches.

10. A connection panel, comprising:
    a frame member;
    14 fifty-position telephone-company-standard terminals provided on a first side of said frame member in two horizontal rows of seven terminals each;
    14 fifty-position telephone-company-standard terminals provided in a horizontal row on a second side of said frame member; and
    means disposed within said frame member providing electrical connections between said first terminals and said second terminals.

11. A connection panel according to claim 10, wherein one of said two rows of terminals on said first side of said frame member is displaced downwardly from the other one of said two rows.

12. A connection panel according to claim 11, wherein said two rows of terminals on said first side of said frame member are separated from each other by a vertical distance that is at least as large as a height of the terminals on said first side of said frame member.

13. A connection panel according to claim 10, wherein all of said 28 terminals are identical.

14. A connection panel according to claim 10, wherein all of said 28 terminals are female terminals.

15. A connection panel according to claim 10, wherein said 28 terminals are the only terminals provided on said connection panel.

16. A connection panel according to claim 10, wherein said first side of said frame member is an opposite side from said second side of said frame member.

17. A connection panel according to claim 10, wherein said frame member is arranged for rack-mounting and has a height of substantially 10.5 inches and a width of substantially 23 inches.

18. A connection panel, comprising:
    a housing having a front side and a rear side different from said front side;
    a plurality of first terminals provided on said front side of said housing, said first terminals all being identical, each being a standard type of terminal;
    a plurality of second terminals provided on said rear side of said housing, said second terminals all having a position layout that is the same as a position layout of said standard type of terminal; and
    means disposed within said housing providing electrical connections between said first terminals and said second terminals.

19. A connection panel according to claim 18, wherein said front side of said housing is an opposite side from said rear side of said housing.

20. A connection panel according to claim 19, wherein said housing is arranged for rack-mounting and has a height of substantially 10.5 inches and a width of substantially 23 inches.

* * * * *